May 10, 1949.  A. A. HIRSCH  2,469,435

REGENERABLE DESICCATOR

Filed Jan. 17, 1944

*A. Adler Hirsch*
INVENTOR.

Patented May 10, 1949

2,469,435

UNITED STATES PATENT OFFICE 2,469,435

REGENERABLE DESICCATOR

Abraham Adler Hirsch, New Orleans, La.

Application January 17, 1944, Serial No. 518,567

7 Claims. (Cl. 34—80)

My invention relates to improvements in laboratory type desiccators; and the broad object of my improvement is to provide a vessel which permits regeneration of the spent or depleted desiccant without the need for its removal from the desiccator. This objective is met by first, incorporating an electrical heater unit in the desiccant reservoir, secondly, forming a recess and suitable holes in the desiccator well to allow electrical and coolant connections, thirdly, placing insulating knobs on the bottom of the desiccator, fourthly, providing water coils for quick cooling in the desiccant bed, and fifthly, forming a sloping groove on the shelf to collect any condensate formed during regeneration for easy removal.

Figure 1:
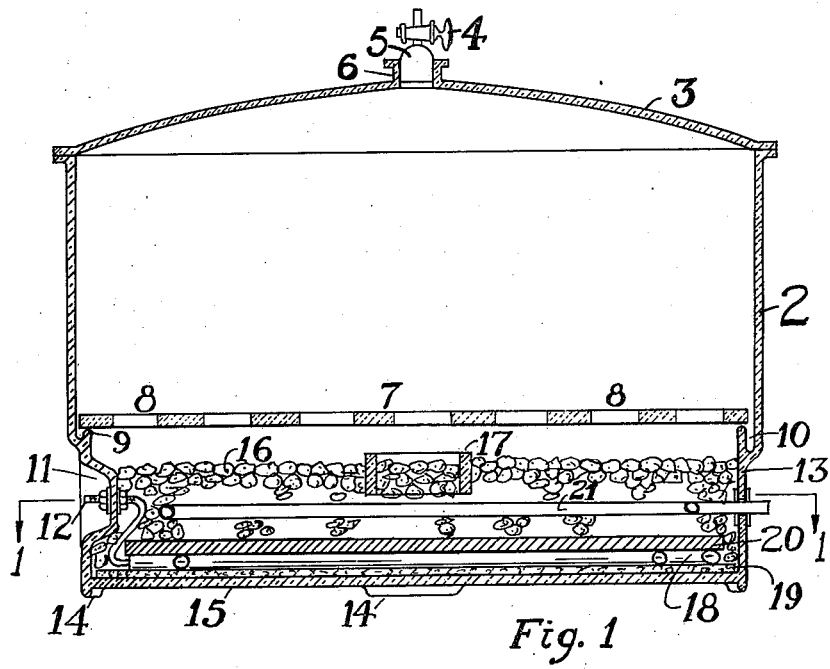
Figure 2:
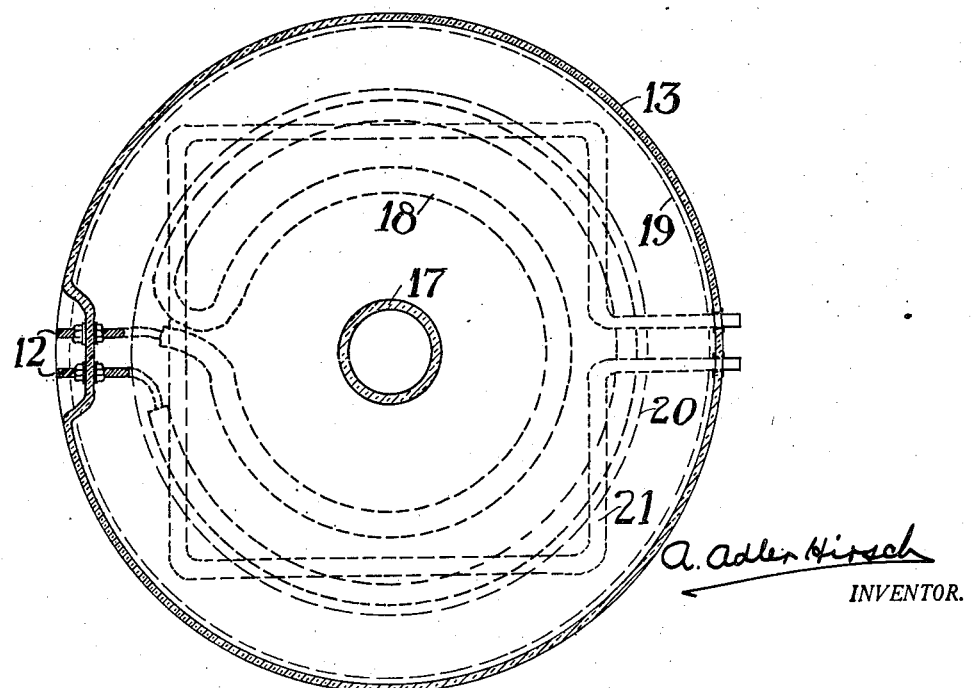

These improvements are illustrated in the accompanying drawings, in which:

Figure 1 is a vertical section of the assembled desiccator, and Figure 2 a section along line 1—1 at the level of the plug-in electrical terminals looking downward. Identical numerals in either view denote same or similar parts.

On the dessicator body 2 is a ground joint or well fitting cover 3 having a stopcock 4 attached to the stopper 5 seated in the top tubulator 6. A drying shelf 7 with holes 8 to hold laboratory vessels spans the lipped rim 9. On the peripheral side of rim 9 is a moisture groove 10 formed monoclinially to collect such condensate as forms and conduct it to a central pool at its lowest section for easy removal. A recess 11 in the desiccator wall allows plug-in prong 12 for electrical connections to protrude without extending beyond outer periphery of desiccator well 13. Lugs 14 raise the bottom 15 of the desiccator vessel off the supporting surface. Inside the desiccator well is the granular bed of desiccant material 16 in whose center inside ring 17 is a portion of the same desiccant material treated with hygrometrically sensitive cobalt chloride or similar solution to serve as an indicator for denoting when regeneration of the main body 16 of the desiccator becomes necessary and when restoration is completed. Electrical heater coil or plate 18 furnishes heat to regenerate spent desiccant while in place inside the dessicator well. An asbestos pad 19 moderates the heat impinging on the bottom of the desiccator. An iron plate 20 evens out heat distribution from the coil 18 to the granular bed. A copper cooling coil 21, which may be connected to a small water line or such, hastens cooling inside the desiccant layer when desirable.

This desiccator is used in the conventional manner until the indicator granules show need for regeneration, at which sign a plug is pushed over the prongs to complete electrical connections with the heater coil. Temperature reached in the bed may be delimited by a thermostatic regulator bulb or by fixing the size of the heater and the magnitude of the current. After expulsion of moisture from the desiccant the electrical connection is broken and the bed allowed to cool, either by radiation or by passing water or coolant through the cooling coil. Any moisture condensing on the walls or dripping into the condensate groove is wiped off while the bed and vessel are still warm. After cooling, the desiccator is ready for another cycle of operation.

Inasmuch as each element described in the above assembly has long been in previous use, I restrict my claims only to their combination in the manner described to achieve a heretofore undescribed new advantage and to certain new improvements in desiccator design, therefore I claim and desire to protect by Letters Patent the following:

1. A regenerable desiccator comprising a suitable vessel with a well-fitting cover thereon, a shelf for supporting objects in the dry environment provided therein, a desiccant bed located beneath said shelf, an electrical heating element under said bed for regenerating it in situ, a heat distribution plate between said bed and said element thereby supporting said bed, a cooling coil within said bed, and heat insulating material between said heating element and the bottom of said vessel, the inner wall of the vessel being provided with a groove of sufficient cross-section to retain condensate drained from said wall during regeneration of said desiccant bed.

2. A regenerable desiccator comprising a suitable vessel with a well-fitting cover thereon, a shelf for laboratory objects mounted in said vessel, the wall of said vessel having a channel of sufficient volume below said shelf for collection of condensate which forms within the vessel during regeneration, a desiccant bed under said shelf, an electrical heating element under said bed for regenerating it, a cooling coil within said bed, and heat distribution means between said bed and said heating element.

3. A regenerable desiccator comprising a suitable vessel with a well-fitting cover thereon, a ledge for support of a suitable shelf, a perforated shelf mounted on said ledge for supporting objects in a dry environment, a desiccant bed located beneath said shelf, a heat distribution plate under said desiccant bed supporting and being overlapped by said desiccant bed, an electrical heating element under said heat distribution plate for regenerating said bed, and means provided above said heating element for cooling said bed, the inner wall of said vessel containing a circumferential recess of sufficient cross-section at the juncture of the wall and supporting ledge for the shelf extending in a sloping manner around said wall for collection and pooling of condensate which gathers and drains down the walls of the vessel during regeneration.

4. A regenerable desiccator comprising a suitable vessel with a well-fitting cover thereon, a shelf supported therein, a desiccant bed resting under said shelf, a quantity of the same desiccant material as that embodied in same bed and treated with a hygrometrically sensitive indicator solution to serve as a warning to show when said bed needs regeneration, an electrical heating element associated with said bed for regenerating it, and a circumferential channel to collect condensate out of liquid phase contact with desiccant material.

5. A regenerable desiccator comprising a suitable vessel with a well-fitting cover thereon, a support therein for holding objects to be retained in a dry state, a desiccant bed underneath said support, a heating means contacting said desiccant bed, and a peripheral channel around the inside walls of said vessel for collection of condensate formed during regeneration so as to facilitate its removal.

6. A regenerable desiccator comprising a suitable vessel with a well-fitting cover thereon, a support therein for holding objects to be retained in the dry state, a desiccant bed underneath said support, a heating means contacting said desiccant bed, a hygrometrically sensitive indicator within said bed to show need for regeneration, and a peripheral channel around the inside surface arranged to collect condensate formed during regeneration.

7. A regenerable desiccator comprising a suitable vessel with a well-fitting cover thereon, a support for objects to be retained in a dry state, a desiccant bed underneath said support, a heating means underneath said bed for regenerating it, a means for heat distribution between said heating means and said desiccant bed, a cooling means within said desiccant bed, an insulating layer over the bottom of said vessel, a hygrometrically sensitive material within said bed to indicate need for regeneration, and a circumferential drain trough into which condensate may collect from the inside wall and cover of said vessel above the level of said desiccant bed.

ABRAHAM ADLER HIRSCH.

REFERENCES CITED

The following references are of record in the file of this patent:

UNITED STATES PATENTS

| Number | Name | Date |
|---|---|---|
| Re. 17,370 | Smith | July 9, 1929 |
| 231,046 | Hyatt | Aug. 10, 1880 |
| 339,619 | Cremer | Apr. 13, 1886 |
| 516,924 | Du Pont | Mar. 20, 1894 |
| 1,092,434 | Daubine | Apr. 7, 1914 |
| 1,533,053 | Wilson | Apr. 7, 1925 |
| 1,694,570 | Watts | Dec. 11, 1928 |
| 1,702,089 | Rohne | Feb. 12, 1929 |
| 1,777,493 | Jadin et al. | Oct. 7, 1930 |
| 1,924,699 | Smith | Aug. 29, 1933 |
| 1,933,927 | Patchell et al. | Nov. 7, 1933 |
| 2,066,847 | McShea | Jan. 5, 1937 |
| 2,067,920 | Heuser | Jan. 19, 1937 |
| 2,083,732 | Moore et al. | June 15, 1937 |
| 2,119,421 | Cross | May 31, 1938 |
| 2,203,144 | Hammond | June 4, 1940 |
| 2,278,854 | Hunsicker | Apr. 7, 1942 |
| 2,283,867 | Flosdorf et al. | May 19, 1942 |
| 2,292,447 | Erwin | Aug. 11, 1942 |

FOREIGN PATENTS

| Number | Country | Date |
|---|---|---|
| 474,148 | Great Britain | Oct. 26, 1937 |

OTHER REFERENCES

"A Method of Drying Complement from the Frozen State," by James Craigie, pp. 75–77 of the British Journal of Experimental Pathology, vol. 12, 1931.